US006422530B1

(12) United States Patent
Williams, III

(10) Patent No.: US 6,422,530 B1
(45) Date of Patent: Jul. 23, 2002

(54) FAIL-SAFE FLUID ACTUATOR

(75) Inventor: James W. Williams, III, 1204 Meetinghouse Rd., Box 336, Gwynedd, PA (US) 19436

(73) Assignee: James W. Williams, III, Gwynedd, PA (US)

( * ) Notice: Subject to any disclaimer, the term of this patent is extended or adjusted under 35 U.S.C. 154(b) by 0 days.

(21) Appl. No.: 09/800,117

(22) Filed: Mar. 6, 2001

Related U.S. Application Data

(60) Provisional application No. 60/187,435, filed on Mar. 7, 2000.

(51) Int. Cl.[7] .............................................. F16K 31/12

(52) U.S. Cl. .......................... 251/27; 251/62; 251/337; 92/130 C; 92/130 D

(58) Field of Search .......................... 251/27, 62, 63.5, 251/337; 92/85 A, 130 R, 130 C, 130 D, 133

(56) References Cited

U.S. PATENT DOCUMENTS

| | | | | |
|---|---|---|---|---|
| 3,974,850 A | * | 8/1976 | Pierson | 137/493.9 |
| 4,519,575 A | * | 5/1985 | Akkerman et al. | 251/1.3 |

* cited by examiner

*Primary Examiner*—Lesley D. Morris
*Assistant Examiner*—Patrick Buechner
(74) *Attorney, Agent, or Firm*—Howson and Howson

(57) ABSTRACT

A fail-safe fluid actuator comprising a piston slidably disposed within a cylinder. In the event of a pressure loss, the piston is urged to a fail-safe position by a plurality of externally mounted constant force spring mechanisms. In one embodiment the mechanisms are located at one end of the cylinder with a telescoping cover for protecting them from exposure and damage. In another embodiment the mechanisms are located at the side of the cylinder whereby the overall length of the actuator is significantly shortened. The fail-safe force applied to the piston by the spring mechanisms is externally adjustable, and they are readily accessible fur replacement or repair.

8 Claims, 3 Drawing Sheets

FAIL-SAFE FLUID ACTUATOR

RELATED U.S. APPLICATIONS

Applicant claims priority of Provisional Application Ser. No. 60/187,435 filed Mar. 7, 2000

FIELD OF THE INVENTION

The present invention relates generally to fluid actuators, and more particularly the invention pertains to a piston type fluid actuator having an externally mounted constant force spring return mechanism for insuring fail-safe positioning in case in fluid pressure.

BACKGROUND OF THE INVENTION

Hydraulic or pneumatic actuators are employed to control operation of numerous types of devices such as valves, jacks, elevators, and heavy machinery. In simplest form, it comprises a cylinder with an open bore in which a piston moves axially when fluid pressure is applied to at least one end of the piston. In case of a failure in fluid pressure, mechanisms are provided which will cause the piston to move the device to a predetermined fail-safe position.

Such mechanisms typically include one or more mechanical coil or constant force springs acting against the piston to move it in the proper direction. A drawback of coil springs is that, due to its spring rate, the applied force against the piston diminishes as it reaches the critical fail-safe position, whereas a constant force spring is coiled in its relaxed state and as it is extended substantially the same force is applied throughout the travel of the piston. For instance U.S. Pat. No. 3,767,160 to Robert F. McCollum discloses a piston-operated regulator valve with constant force springs which urge the valve to a normally closed or open position when there is no fluid pressure. In one design the springs and piston are mounted to the valve body on opposite sides. The disadvantage of this design is it requires separate mounting flanges and seals on both sides of the valve body. In another design the springs are installed inside the piston cylinder. This requires the piston cylinder to be disassembled in order to inspect, adjust or replace the springs. In addition, the number of springs that can be installed in the cylinder is limited by size.

SUMMARY OF THE INVENTION

Accordingly, it is an object of the present invention to provide a fail-safe actuator with fail-safe spring return which can be easily mounted on a controlled device and adjusted for spring force.

Another object of the invention is to provide a piston-type fluid actuator having an external constant force spring return mechanism which is readily accessible for inspection, adjustment and replacement of the mechanism without disassembling the actuator or removing it from service.

Still another object of the invention is to provide a piston type fluid actuator in which the number of constant force springs required for fail-safe operation is not limited by the size of the piston cylinder.

A further object of the invention is to provide a lightweight self-adjusting enclosure for protecting a spring return mechanism mounted externally on a piston type fluid actuator.

A further object of the invention is to provide a fail-safe actuator which is less costly to manufacture and maintain than prior designs.

A still further object of the invention is to provide a fail-safe return mechanism utilizing constant-force springs which can be easily replaced.

These and other objects and advantages of the invention are accomplished by a fail-safe fluid actuator comprising a piston slidably disposed within a cylinder. In the event of a pressure loss, the piston is urged to a fail-safe position by a plurality of externally mounted constant force spring mechanism. In one embodiment the mechanism is located at one end of the cylinder with a telescoping cover for protecting it from exposure and damage. Another embodiment the mechanism is located at the side of the cylinder whereby the overall length of the actuator is significantly shortened. The fail-safe force applied to the piston by the springs is externally adjustable, and the springs are readily accessible for replacement or repair.

BRIEF DESCRIPTION OF THE DRAWINGS

Other objects and novel features and advantages of the invention will become apparent from the following description when taken in conjunction with the accompanying drawings wherein.

DESCRIPTION OF THE PREFERRED EMBODIMENT

Figure 1:
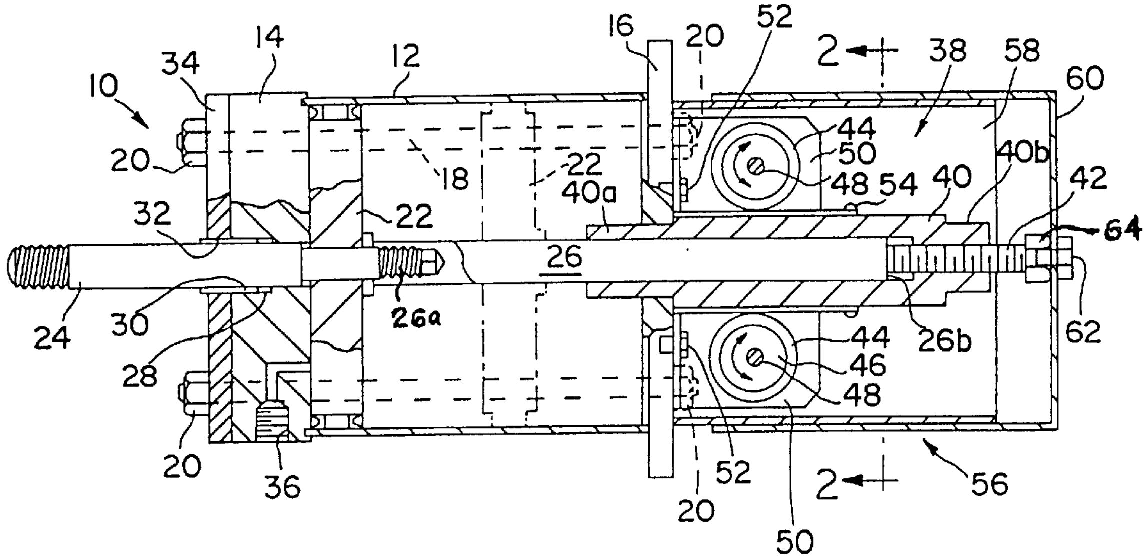
FIG. 1 represents one embodiment according to the invention, in a longitudinal view partially in cross section, of a fail-safe fluid actuator containing a piston in the fail-safe position and in broken outline under operating fluid pressure.

Referring now to the drawings wherein like reference numerals and characters designate like or corresponding parts throughout the several views, there is illustrated one embodiment of a fail-safe fluid actuator 10 in a fail-safe position when there is no operating fluid pressure being applied.

Actuator 10 includes a cylinder housing 12, sealed between a cylinder end 14 having a square perimeter and a cylinder end 16 having a circular perimeter, by rods 18 and nuts 20, and a piston 22 slidably disposed therein. One end of a piston rod 24 passes coaxially through piston 22 and is secured thereto by threadingly engaging on end 26*a* of a coaxial rod extension 26. The other end of piston rod 24, adapted for connecting to a controlled device such as a valve (not shown), slidably extends through a seal 28 held under compression in a bore 30 of cylinder end 14 and through an aperture 32 of an end plate 34 secured to cylinder end 14 by tie rods 18.

A port 36 in cylinder end 14 provides for admission and release of operating fluid pressure in cylinder housing 12 acting against the facing surface of piston 22.

A fail-safe spring return mechanism 38 is externally mounted on cylinder end 16 and operatively connected to piston rod 24 to urge piston 22 toward cylinder end 14.

Mechanism 38 comprises a sleeve 40 with four mutually orthogonal sides slidably receiving the other end of rod extension 26. A reduced circular end portion 40*a* is inserted through an aligned bore in cylinder end 16. An adjusting bolt 42 coaxially received in a threaded end 40*b* of sleeve 40 contacts an end face 26*b* of rod extension 26 for fine tuning the spring return force applied to the end of rod extension 26.

Figure 2:
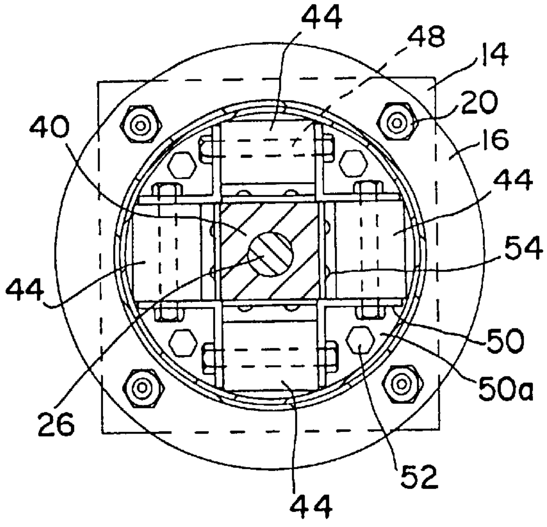
FIG. 2 is a transverse view in cross section of the fluid actuator of FIG. 1 taken in a plane along the line 2—2 thereof.
Figure 3:
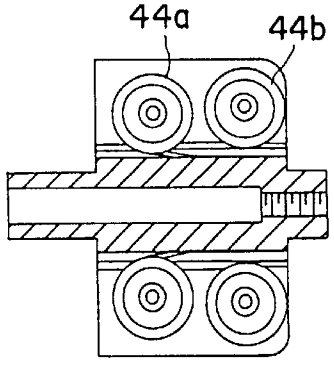
FIG. 3 represents an another embodiment of a constant force spring mechanism for the fluid actuator of FIGS. 1 and 2.

Four spools of constant force springs 44, also referred to as spring motors, are each tightly coiled in its relaxed state and mounted on a drum 46, preferably of nylon, by opening the spring coil and releasing it after the drum is inserted. Springs 44 are usually fabricated in laminated strips, the number depending on the return force needed. Also, spools of springs may be added as well, either or both in a radial array as shown in FIG. 2 or in tandem as shown in FIG.3. Each drum 46 and spring 44 are rotatably carried on a spindle 48 supported at its ends on an axis parallel to a side of sleeve 40 between parallel facing sides of upright angle brackets 50. Each bracket 50 is removably secure at one end to cylinder end 16 by a bolt 52 passing through a triangular web 50*a* extending across the sides.

The free or outer end of each spring 44 is attached by fasteners 54 to a respective side of sleeve 40 and transmits a return force via sleeve 40 and rod extension 26 to piston 22 whenever fluid pressure, introduced through port 36 to cylinder housing 12, causes piston 22 to move in the direction shown in phantom outline as spring 44 extends with sleeve 40 at a constant spring force. A loss of pressure allows spring 44 to return the piston to the fail-safe position adjacent to cylinder end 14.

Actuator 10 is further provided with a telescopic enclosure 56 for protecting spring return mechanism 38 from harmful contaminant and accidental intrusion. Enclosure 56 comprises an inner tubular member 58 coaxial with cylinder housing 12 and surrounding spring return mechanism 38. One end is fixed to cylinder 16 and the other end is open. An outer tubular member 60 is closed at one end and axially slidable over inner member 58. Adjusting bolt 42 is secured to the closed end of member 60 by nuts 62 and 64 for enabling the outer member to slide axially along member 58 as sleeve 40 extends and retracts with piston 22.

FIG. 3 shows an alternate embodiment of a constant force spring for use in a fluid actuator according to the invention. As briefly noted above, it comprises two springs 44*a* and 44*b* mounted between each pair of angle brackets. As applied to the radial configuration in FIG. 2 of a sleeve with four sides, a total of eight springs are employed to provide a commensurate increase in spring return force.

Figure 4:
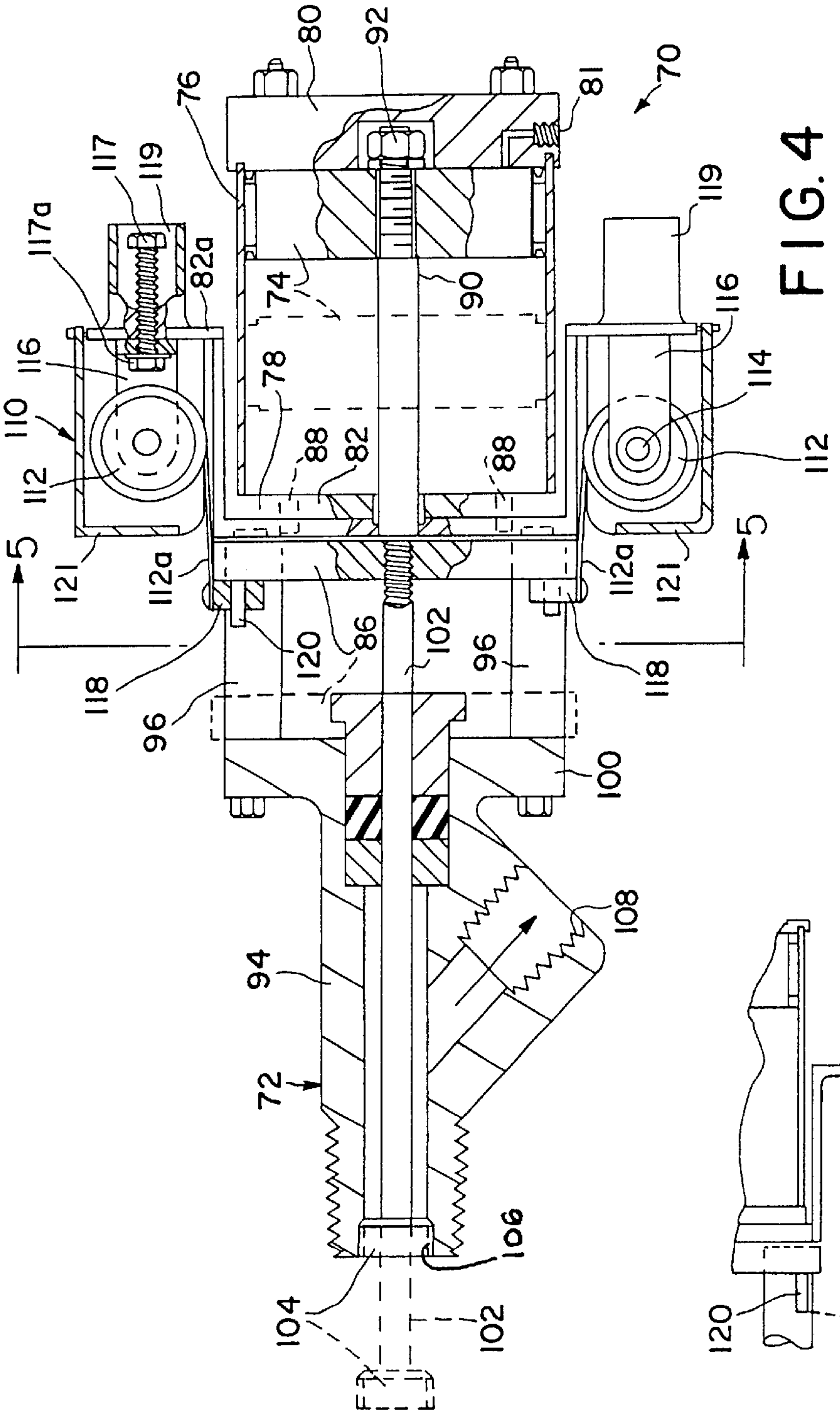
FIG. 4 represents a longitudinal view partially in cross section of still another embodiment of a fail-safe fluid actuator according to the invention.
Figure 5:
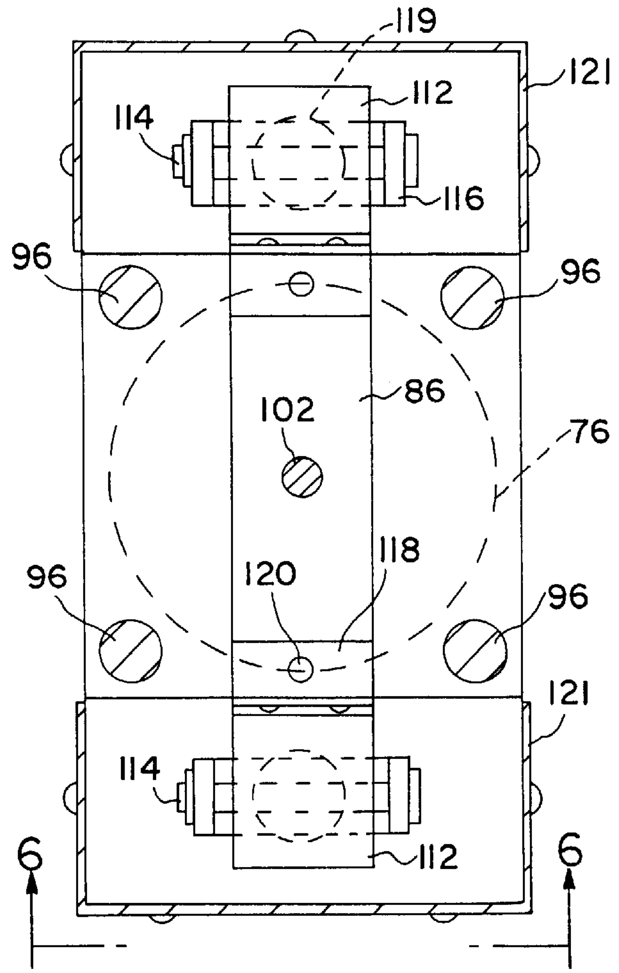
FIG. 5 is a transverse cross section of the actuator of FIG. 4 taken in a plane along the line 5—5 thereof.
Figure 6:
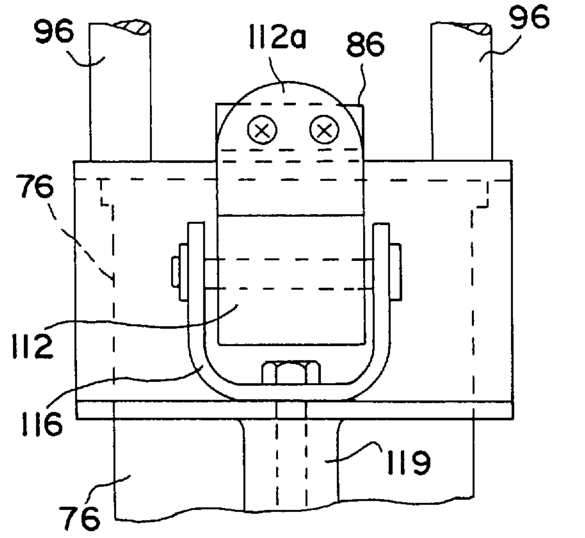
FIG. 6 is fragmentary view of the actuator of FIG. 4 taken along the line 6—6 of FIG. 5 with a cover removed.

FIGS. 4–6 represent another embodiment of a fail-safe fluid actuator 70, according to the invention, operatively connected to a poppet valve 72 shown in solid lines in a fail-safe closed position with no operating fluid pressure present in actuator 70, and in broken lines in an open position when fluid operating pressure is present.

Actuator 70 consists of a piston 74 reciprocative in a short-stroke cylinder 76 between cylinder heads 78 and 80. A port 81 in head 80 provides communication between the chamber formed between piston 74 and head 80 and a source of operating fluid pressure source, not shown. A spring support member 82 is contiguously secured to head 78 by threaded fasteners 88. A piston rod 90 is threadingly secured at one end to piston 74 by a bolt 92; the other end slidably extending through support member 82 and threadingly connected to a crosshead 86 for reciprocating with piston 74 and rod 90.

Poppet valve 72 includes a valve body 94 mounted in axial alignment with actuator 70 by four parallel, spaced-apart yoke posts 96 threadingly secured between a flange 100 of valve body 94 and support member 82. A valve stem 102 slidably extending through valve body 94 is threadingly connected at one end in coaxially alignment with the end of piston rod 90 abutting crosshead 86. The other end of stem 102 includes a sealing disc 104 arranged to close an inlet port 106 of valve 72 under fail-safe conditions. Under safe conditions, sealing disc 104 opens inlet port 106 permitting pressurized fluid to flow to an outlet port 108 in valve 72.

A pair of spring return mechanisms 110 are mounted on outwardly disposed flange portions 82*a* of support member 82 located on opposite sides of cylinder 76 for urging piston 74 and valve stem 102 toward the fail-safe position. Each mechanism 110 includes a constant force spring 112 rotatable on a spindle 114 between bifurcated ends of a bracket 116 and in a plane normal to the axis of cylinder 76. Spindle 114 is held in place such as by a cotter pin. Bracket 116 is secured to flange portion 78 by an adjustable tensioning screw 117 and a locking nut 117*a*. A spring capsule 118 fixed to an outer end 112*a* of spring 112 includes a hole which registers with a post 120 projecting from crosshead 86 for transmitting a spring return force to piston 74 and fail-safe position to valve 72. A sleeve 119 extending from flange portion 82*a*, and a cover 121, removably secured to flange portion 82*a*, shield component parts of the spring return mechanism 110. Like the springs in actuator 10 supra, 112 are usually fabricated in laminated strips—the number depending on the return force needed. When an even greater return force is required, additional springs may be employed around the actuator or in tandem as shown in FIG.3.

In operation, when fluid pressure is introduced through port 81, the force applied to piston 74 moves crosshead 86 in the direction shown in broken outline against the constant spring-return force of springs 114 whereby sealing disc 104 moves out of valve body 94 to open inlet port 106. A loss of pressure allows disc 104 to return to the fail-safe position and close inlet port 106.

Figure 7:
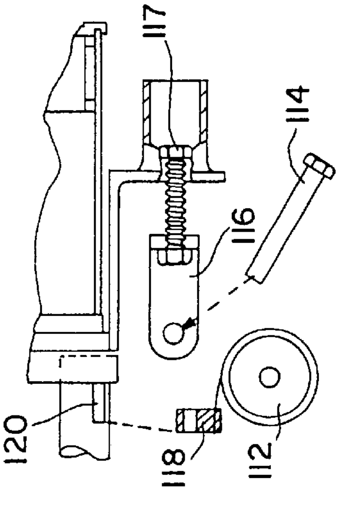
FIG. 7 shows a portion of the actuator illustrating the manner of removing a constant force spring for repair or replacement.

FIG. 7 illustrates the manner by which a constant force spring 112 can be removed for repair or replacement. Tensioning screw 117 is turned to release the tension on spring 112 permitting the cotter pin and spindle 114 to be removed from bracket 116. Spring capsule 118 lifted off of post 120 for replacement by a repaired or new capsule and spring assembly. The new or repaired spring may now be installed in bracket 116 with the spindle and cotter, and the tensioning screw turned to extend the spring.

Some of the many advantages of the invention should now be readily apparent. For instance, a fail-safe fluid actuator is provided which can be easily mounted on a controlled device such as on the body of a valve and tailored for the appropriate spring return force necessary for fail-safe operation. The spring return mechanism is readily accessible for inspection, fine adjustment, maintenance and repair, and can be completely removed for replacement without having to disassemble the piston and cylinder housing assembly. The number of constant force spring is not limited by the size of the cylinder housing. The spring return mechanism is completely shielded from contaminating materials and from possible mechanical abuse at all times of operation. The design particularly lends itself to simplicity of parts and manufacture with attendant lower costs.

It will be understood, of course, that various other changes in the details, materials, and arrangement of parts, which have been herein described and illustrated in order to explain the nature of the invention, may be made by those skilled in the art within the principles and scope of the invention as expressed in the appended claims.

What is claimed is:

1. A fail-safe fluid actuator, comprising, in combination:

a cylinder housing with opposed ends forming an enclosed chamber;

a piston slidably disposed in said chamber and having a coaxial piston rod with opposed ends, one of said rod ends being connected to said piston and extending through one of said housing ends for connecting to a controlled device;

a rod extension having, opposed ends, one of said ends being connected to the other of said rod ends and extending through the other of said housing ends;

a sleeve slidably receiving the other of said rod extension ends and slidably received in an opening in said other housing end, said sleeve having a plurality flat sides;

a plurality of pairs of parallel upright members secured to said other housing end and aligned lengthwise with respective ones of said flat sides; and a constant force spring rotatably supported between each pair of said upright members on an axis parallel to an adjacent one of said flat sides, said spring having an extended end secured to said one flat side.

2. A fluid actuator according to claim 1 further comprising:

a bolt threadingly connected to said sleeve at an end distal from said other housing end and abutting said other rod extension end for fine adjustment of the spring return force.

3. A fluid actuator according to claim 1 further comprising;

a tubular inner member surrounding said upright members and said springs;

a tubular outer member having one end thereof slidable over the length of said inner member and the other end thereof closed; and fastening means securing said outer member to said sleeve.

4. A fail-safe fluid actuator for a valve closure element, comprising:

a cylindrical housing having opposed end walls and an axially reciprocative piston;

a spring support member externally fixed to one of said end walls;

a piston rod having opposed rod ends, one of said rod ends being fixed to said piston and the other of said rod ends slidably extending through the other of said end walls;

a crosshead threadingly connected to the other of said rod ends for moving the valve closure element; and a constant force spring mechanism operatively connected to said support member and said crosshead for urging closure element of the valve to a fail-safe position upon loss of fluid operating pressure.

5. A fluid actuator according to claim 4 wherein said spring mechanism comprises:

a bracket having bifurcated arms extending from said support member;

a spindle rotatably supported at opposed ends thereof between said bifurcated arms on an axis lying in a plane normal to the cylindrical axis of said cylinder; and a constant force coil spring fixed at the inner end thereof to said spindle and an extended end thereof connected to an end of said crosshead proximal to said extended end.

6. A fluid actuator according to claim 5 wherein said spring mechanism further comprises:

an adjusting screw threadingly connected between said support member and said bracket for releasing the tension of said coil spring.

7. A fluid actuator according to claim 6 wherein said spring mechanism further comprises:

a post fixed to said crosshead in proximity to said coil spring; and a capsule fixed to the extended end of said coil spring having a hole registering with said post for retaining said coil spring in tension.

8. A fluid actuator for a valve, comprising:

a cylindrical housing having two opposed end walls and an axially reciprocative piston operatively connected to the valve;

a rod having opposed ends, one of said rod ends being connected to said piston and slidably extending through one of said end walls, and the other of said rod ends adapted to be operatively connected to the valve;

a port in the other of said end walls for communicating a fluid operating pressure to said housing for opening the valve; and a spring mechanism supported by said housing and operatively connected to said piston for urging the valve to a fail-safe closed position upon loss of said fluid operating pressure, said spring mechanism including a spindle supported at the ends thereof between parallel support members on an axis lying in a plane normal to the cylindrical axis of said cylinder, and a constant force spring rotatably carried on said spindle with the outer end of said spring operatively connected to said rod.

* * * * *